United States Patent
Camacho Cardenas et al.

(10) Patent No.: US 11,808,260 B2
(45) Date of Patent: Nov. 7, 2023

(54) MUD PUMP VALVE LEAK DETECTION AND FORECASTING

(71) Applicant: Cameron International Corporation, Houston, TX (US)

(72) Inventors: Alejandro Camacho Cardenas, Houston, TX (US); Vishwanathan Parmeshwar, Houston, TX (US); Manat Singh, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 471 days.

(21) Appl. No.: 16/901,166

(22) Filed: Jun. 15, 2020

(65) Prior Publication Data

US 2021/0388831 A1    Dec. 16, 2021

(51) Int. Cl.
| | |
|---|---|
| F04B 51/00 | (2006.01) |
| G01M 3/28 | (2006.01) |
| G01M 3/22 | (2006.01) |
| G01M 3/38 | (2006.01) |
| F04B 7/04 | (2006.01) |
| F04B 53/10 | (2006.01) |
| G01M 3/24 | (2006.01) |
| E21B 21/00 | (2006.01) |
| F04B 15/02 | (2006.01) |

(52) U.S. Cl.
CPC .............. *F04B 51/00* (2013.01); *F04B 7/04* (2013.01); *F04B 53/1032* (2013.01); *G01M 3/224* (2013.01); *G01M 3/24* (2013.01); *G01M 3/2876* (2013.01); *G01M 3/38* (2013.01); *E21B 21/00* (2013.01); *F04B 15/02* (2013.01)

(58) Field of Classification Search
CPC . F04B 51/00; F04B 7/04; G01M 3/24; G01M 3/224; G01M 3/2876; G01M 3/38
See application file for complete search history.

(56) References Cited

U.S. PATENT DOCUMENTS

| | | | | |
|---|---|---|---|---|
| 4,086,497 A | * | 4/1978 | Murray | G01M 3/38 250/223 R |
| 5,451,773 A | * | 9/1995 | Triner | G01N 21/9036 356/240.1 |
| 5,745,049 A | | 4/1998 | Akiyama et al. | |

(Continued)

FOREIGN PATENT DOCUMENTS

| | | | | |
|---|---|---|---|---|
| GB | 2567246 A | * | 4/2019 | G01M 3/38 |
| KR | 20180075943 A | * | 12/2016 | |

(Continued)

*Primary Examiner* — Kristina M Deherrera
*Assistant Examiner* — Fatemeh Esfandiari Nia
(74) *Attorney, Agent, or Firm* — Jeffrey D. Frantz

(57) ABSTRACT

A system and method for controlling a pump in a drilling system, of which the method includes determining a plurality of baseline behaviors for one or more valves of the pump, determining a plurality of in-use behaviors for the one or more valves of the pump. Each of the plurality of in-use behaviors are determined based on one or more measurements from one or more sensors. The method also includes comparing the in-use behaviors and the baseline behaviors, and forecasting, based on the comparison of the in-use behaviors and the baseline behaviors, a remaining useful life of the at least one of the one or more valves.

12 Claims, 9 Drawing Sheets

(56) References Cited

U.S. PATENT DOCUMENTS

| | | |
|---|---|---|
| 6,898,968 B2 | 5/2005 | Biester |
| 6,941,244 B1 | 9/2005 | Saito |
| 7,062,960 B2 | 6/2006 | Couren |
| 7,099,649 B2 | 8/2006 | Patterson |
| 7,143,007 B2 | 11/2006 | Long |
| 7,274,989 B2 | 9/2007 | Hopper |
| 7,302,842 B2 | 12/2007 | Biester et al. |
| 7,880,634 B2 | 2/2011 | Fuller et al. |
| 7,925,472 B2 | 4/2011 | Nasr et al. |
| 8,112,521 B2 | 2/2012 | Barnett et al. |
| 8,134,474 B2 | 3/2012 | Fuller et al. |
| 8,204,697 B2 | 6/2012 | Garvey et al. |
| 8,216,517 B2 | 7/2012 | Prasad et al. |
| 8,347,957 B2 | 1/2013 | Stephenson et al. |
| 8,423,397 B2 | 4/2013 | Sitton |
| 8,490,705 B2 | 7/2013 | Curtiss, III |
| 8,503,190 B2 | 8/2013 | Tart et al. |
| 8,554,717 B2 | 10/2013 | Reckmann et al. |
| 8,560,096 B1 | 10/2013 | Chapman et al. |
| 8,560,097 B1 | 10/2013 | Chapman et al. |
| 8,583,597 B2 | 11/2013 | Atamna et al. |
| 8,676,721 B2 | 3/2014 | Piovesan et al. |
| 8,761,910 B1 | 6/2014 | Chapman, Jr. et al. |
| 8,761,911 B1 | 6/2014 | Chapman et al. |
| 8,761,912 B1 | 6/2014 | Chapman, Jr. et al. |
| 8,781,743 B2 | 7/2014 | McKay et al. |
| 8,819,652 B2 | 8/2014 | Zingelewicz et al. |
| 8,825,567 B2 | 9/2014 | Jiang et al. |
| 8,898,525 B2 | 11/2014 | Loganathan et al. |
| 8,978,699 B2 | 3/2015 | Jaffrey et al. |
| 9,053,468 B2 | 6/2015 | Haynes et al. |
| 9,163,471 B2 | 10/2015 | Coonrod et al. |
| 9,187,974 B2 | 11/2015 | Coonrod et al. |
| 9,410,392 B2 | 8/2016 | Jaffrey et al. |
| 9,546,545 B2 | 1/2017 | Cardellini et al. |
| 9,587,461 B1 | 3/2017 | Jaffrey et al. |
| 9,633,067 B2 | 4/2017 | Maddock |
| 9,634,581 B2 | 4/2017 | Jaffrey |
| 9,658,130 B2 | 5/2017 | Veeningen |
| 9,677,573 B2 | 6/2017 | Jaffrey |
| 9,732,879 B2 | 8/2017 | Jaffrey |
| 9,804,039 B2 | 10/2017 | Reyes, III et al. |
| 9,934,479 B2 | 4/2018 | Sanchez et al. |
| 9,964,135 B2 | 5/2018 | Jaffrey et al. |
| 9,970,569 B2 | 5/2018 | Kotrla et al. |
| 9,988,870 B2 | 6/2018 | Gray |
| 10,087,745 B2 | 10/2018 | Gottlieb et al. |
| 10,151,160 B2 | 12/2018 | Jaffrey et al. |
| 10,161,225 B2 | 12/2018 | Jaffrey et al. |
| 10,175,287 B2 | 1/2019 | Jaffrey et al. |
| 10,215,009 B2 | 2/2019 | Tjostheim et al. |
| 10,221,674 B2 | 3/2019 | Samuel |
| 10,246,994 B2 | 4/2019 | Jaffrey |
| 10,248,141 B2 | 4/2019 | McKeon et al. |
| 10,256,676 B2 | 4/2019 | Gray |
| 10,273,774 B2 | 4/2019 | Jaffrey |
| 10,287,869 B2 | 5/2019 | Jaffrey |
| 10,317,875 B2 * | 6/2019 | Pandurangan ....... G08B 21/185 |
| 10,329,875 B2 | 6/2019 | Reyes, III et al. |
| 10,392,924 B2 | 8/2019 | Gray |
| 10,408,641 B2 | 9/2019 | Gaude |
| 10,502,021 B2 | 12/2019 | Healy |
| 10,570,689 B2 | 2/2020 | Jaffrey |
| 10,648,317 B2 | 5/2020 | Dykstra et al. |
| 10,685,335 B2 | 6/2020 | Buca et al. |
| 10,769,323 B2 | 9/2020 | Camacho Cardenas |
| 2002/0041379 A1 * | 4/2002 | Lin ........................ G01M 3/047 356/483 |
| 2004/0115818 A1 * | 6/2004 | Puri ....................... G01M 3/042 436/3 |
| 2007/0140869 A1 * | 6/2007 | St. Michel .............. F04B 49/22 417/63 |
| 2008/0041141 A1 * | 2/2008 | Discenzo ................. G01L 1/241 73/66 |
| 2010/0300683 A1 * | 12/2010 | Looper .................. E21B 47/008 166/250.01 |
| 2012/0308409 A1 * | 12/2012 | Levine .................... F04B 23/02 417/274 |
| 2013/0218484 A1 * | 8/2013 | Kar ........................ G01M 15/05 702/35 |
| 2014/0074260 A1 | 3/2014 | Schroeder et al. |
| 2014/0182381 A1 | 7/2014 | Comeaux et al. |
| 2014/0231075 A1 | 8/2014 | Springett et al. |
| 2015/0022326 A1 | 1/2015 | Baxter |
| 2015/0294048 A1 | 4/2015 | Jones |
| 2016/0131692 A1 | 5/2016 | Jaffrey |
| 2016/0168979 A1 | 6/2016 | Zhang |
| 2016/0179751 A1 | 6/2016 | Korjani |
| 2016/0186516 A1 | 6/2016 | Jaffrey |
| 2016/0217379 A1 | 7/2016 | Patri et al. |
| 2016/0237773 A1 | 8/2016 | Dalton et al. |
| 2016/0274551 A1 | 9/2016 | Mishra et al. |
| 2016/0292652 A1 | 10/2016 | Bowden, Jr. et al. |
| 2016/0371957 A1 | 12/2016 | Ghaffari et al. |
| 2017/0268323 A1 | 9/2017 | Dykstra et al. |
| 2018/0142543 A1 | 5/2018 | Gupta et al. |
| 2018/0363421 A1 | 12/2018 | Harshbarger et al. |
| 2019/0120023 A1 | 4/2019 | Ocegueda-Hernandez et al. |
| 2019/0145891 A1 * | 5/2019 | Waxman ................ G01M 3/38 356/409 |
| 2019/0264545 A1 | 8/2019 | Camacho Cardenas et al. |
| 2020/0003611 A1 | 1/2020 | Turner et al. |
| 2020/0123878 A1 | 4/2020 | Yepez |
| 2020/0370988 A1 * | 11/2020 | Rogers ................ G01M 3/2876 |

FOREIGN PATENT DOCUMENTS

| | | | |
|---|---|---|---|
| KR | 102202367 B1 * | 2/2020 | |
| WO | 2016026680 A1 | 2/2016 | |
| WO | WO-2019132953 A1 * | 7/2019 | ............. F04B 15/02 |
| WO | 2020018492 A1 | 1/2020 | |
| WO | WO-2020077469 A1 * | 4/2020 | |

* cited by examiner

MUD PUMP VALVE LEAK DETECTION AND FORECASTING

BACKGROUND

Mud pumps are used in oil and gas drilling rigs to pump drilling fluid though a drillstring and into a well. The drilling fluid (or "mud") may serve a variety of purposes, including removal of drill cuttings, pressure control in the well, and lubrication of drilling components, among others. Mud pumps are generally positive displacement pumps, which employ a reciprocating piston that is driven into and out of a pressure chamber. The mud pumps may have three such reciprocating pistons and pressure chambers. These are referred to as "triplex" pumps.

To control the pressure increase in fluid contained in the pressure chambers, valves are used. For example, an inlet valve allows fluid into the pressure chamber, and an outlet valve allows fluid to exit the pressure chamber. During the downstroke of the piston, both valves may be closed until the desired pressure is reached, at which point the discharge valve opens.

The drilling fluid may be abrasive or otherwise harsh to components of the mud triplex, especially the valves. Indeed, the valves may be formed with seals, which may be elastomeric so as to form fluid-tight seals. These seals may have a short lifecycle, in comparison to, e.g., the metal housing or piston components of the pump, before they are worn and replaced. When a valve seal is worn, its sealing effectiveness diminishes, and it may allow fluid to leak past the valve, even when the valve is nominally closed. Accordingly, pump efficiency dictates that worn out seals are replaced. Replacing seals before the end of their effective life, however, may incur additional costs and drilling delays, that might be avoided.

In practice, it may be difficult to determine when a seal is worn. One technique used in the industry is to simply replace the seals at standard intervals, with the standard intervals generally being related to an estimate of the seal lifecycle. However, such a rough estimation procedure leads to some seals being replaced too late, and some being replaced too soon, and thus potentially realizing the drawbacks discussed above.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments of the disclosure may provide a method for controlling a pump in a drilling system. The method includes determining a plurality of baseline behaviors for one or more valves of a pump, and determining a plurality of in-use behaviors for the one or more valves of the pump. Each of the plurality of in-use behaviors are determined based on one or more measurements from one or more sensors. The method also includes comparing the in-use behaviors and the baseline behaviors, and forecasting, based on the comparison of the in-use behaviors and the baseline behaviors, a remaining useful life of the at least one of the one or more valves.

Embodiments of the disclosure may also provide a system for pumping fluid into a well. The system includes a pump comprising one or more valves, a leakage detection system coupled to the pump and comprising one or more sensors, and a processor coupled to the leakage detection system, the processor configured to perform operations by executing computer-readable instructions stored on a non-transitory computer-readable medium. The operations include determining a plurality of baseline behaviors for the one or more valves, and determining a plurality of in-use behaviors for the one or more valves. Each of the plurality of in-use behaviors are determined based on one or more measurements from the one or more sensors. The operations further include comparing the in-use behaviors and the baseline behaviors, and forecasting, based on the comparison of the in-use behaviors and the baseline behaviors, a remaining useful life of the at least one of the one or more valves.

Embodiments of the disclosure may provide a non-transitory, computer-readable medium storing instructions that, when executed by at least one processor of a computing system, cause the computing system to perform operations. The operations include determining a plurality of baseline behaviors for one or more valves of a pump. The baseline behaviors include at least two of a static pressure, a pressure response to a position of a piston of the pump, vibration in the pump, resonant frequency of the one or more valves, light passage across the one or more valves of the one or more valves, or detection of a marker material in fluid pumped by the pump. The operations also include determining a plurality of in-use behaviors for the one or more valves of the pump. Each of the plurality of in-use behaviors are determined based on one or more measurements from one or more sensors. The operations further include comparing the in-use behaviors and the baseline behaviors, and forecasting, based on the comparison of the in-use behaviors and the baseline behaviors, a remaining useful life of the at least one of the one or more valves.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these terms are used to distinguish one element from another and do not imply that any one of these elements is a requirement for another to be present (e.g., a second element can be present without the first element). More particularly, a first object or action could be termed a second object or action, and, similarly, a second object or action could be termed a first object or action, without departing from the scope of the present disclosure. The first object or action, and the second object or action, are both, objects or actions, respectively, but they are not to be considered the same object or action.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Further, as used herein, the terms "inner" and "outer"; "up" and "down"; "upper" and "lower"; "upward" and "downward"; "upstream" and "downstream"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Figure 1:
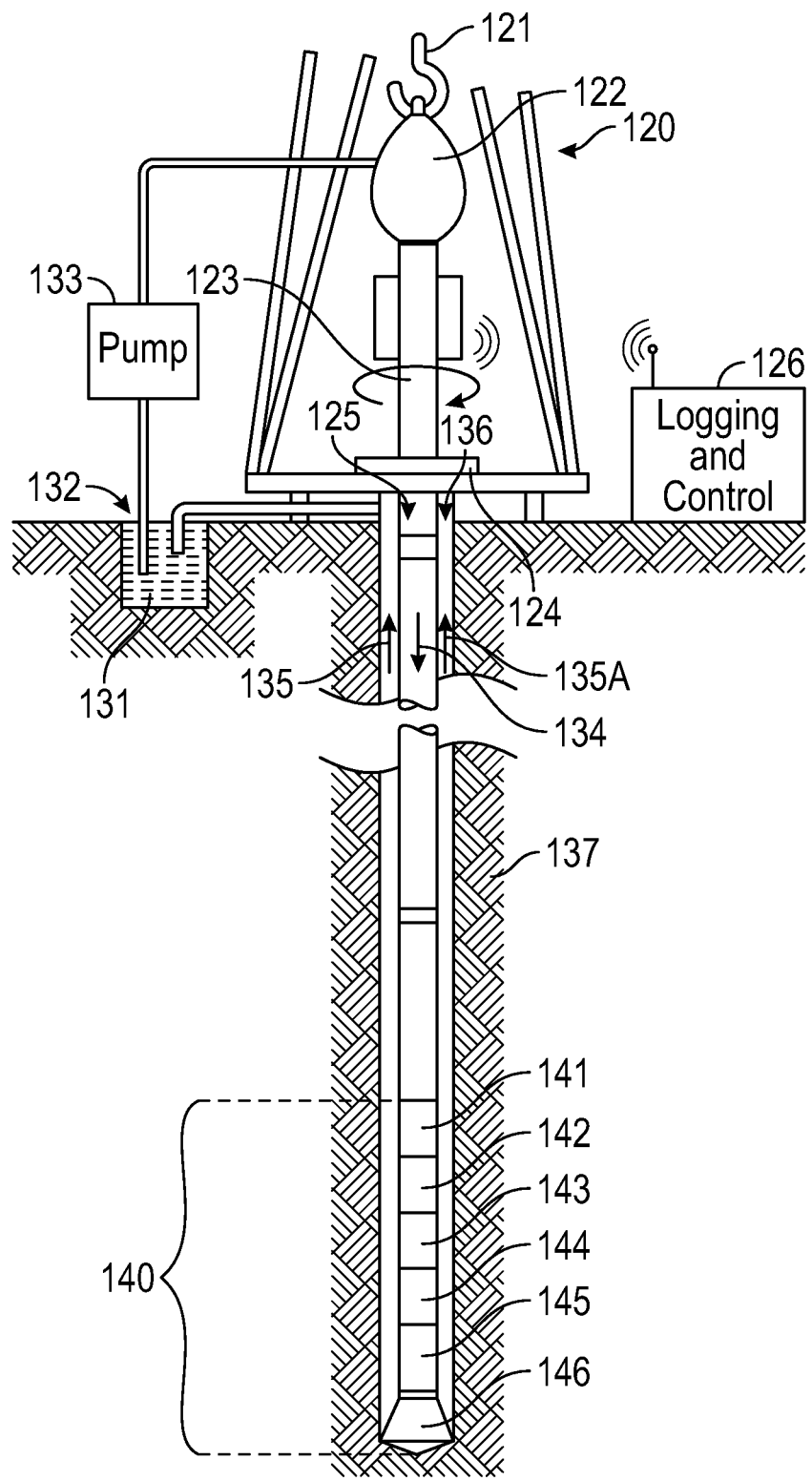
FIG. 1 illustrates a schematic view of a wellsite system, according to an embodiment.

FIG. 1 illustrates a wellsite system, which may implement various aspects of the present disclosure, according to an embodiment. The wellsite can be onshore or offshore. In this example system, a borehole is formed in subsurface formations by rotary drilling in a manner that is well known. A drill string 125 is suspended within a borehole 136 and has a bottom hole assembly (BHA) 140 which includes a drill bit 146 at its lower end. A surface system 120 includes platform and derrick assembly positioned over the borehole 136, the assembly including a rotary table 124, kelly (not shown), hook 121, and rotary swivel 122. The drill string 125 is rotated by the rotary table 124 energized by one or more devices not shown, which engages the kelly (not shown) at the upper end of the drill string 125. The drill string 125 is suspended from the hook 121, attached to a traveling block (also not shown), through the kelly (not shown) and the rotary swivel 122 which permits rotation of the drill string 125 relative to the hook 121. In other embodiments, a top drive system could be used instead of the rotary table system shown in FIG. 1.

In the illustrated example, the surface system 120 further includes drilling fluid or mud 132 stored in a pit 131 formed at the well site. A pump 133 delivers the drilling fluid to the interior of the drill string 125 via a port (not shown) in the swivel 122, causing the drilling fluid to flow downwardly through the drill string 125 as indicated by the directional arrow 134. The drilling fluid exits the drill string via ports (not shown) in the drill bit 146, and then circulates upwardly through an annulus region between the outside of the drill string 125 and the wall of the borehole 137, as indicated by the directional arrows 135 and 135A. In this manner, the drilling fluid lubricates the drill bit 146 and carries formation cuttings up to the surface as it is returned to the pit 131 for recirculation.

The BHA 140 of the illustrated embodiment may include a measuring-while-drilling (MWD) tool 141, a logging-while-drilling (LWD) tool 144, a rotary steerable directional drilling system 145 and motor, and the drill bit 146. It will also be understood that more than one LWD tool and/or MWD tool can be employed, e.g. as represented at 143.

The LWD tool 144 is housed in a special type of drill collar and can contain one or a plurality of known types of logging tools. The LWD tool 144 may include capabilities for measuring, processing, and storing information, as well as for communicating with the surface equipment. In the present example, the LWD tool 144 may any one or more well logging instruments known in the art, including, without limitation, electrical resistivity, acoustic velocity or slowness, neutron porosity, gamma-gamma density, neutron activation spectroscopy, nuclear magnetic resonance and natural gamma emission spectroscopy.

The MWD tool 141 is also housed in a special type of drill collar, as is known in the art, and can contain one or more devices for measuring characteristics of the drill string and drill bit. The MWD tool 141 further includes an apparatus 142 for generating electrical power to the downhole system. This may typically include a mud turbine generator powered by the flow of the drilling fluid, it being understood that other power and/or battery systems may be employed. In the present embodiment, the MWD tool 141 may include one or more of the following types of measuring devices: a weight-on-bit measuring device, a torque measuring device, a vibration measuring device, a shock measuring device, a stick slip measuring device, a direction measuring device, and an inclination measuring device. The power generating apparatus 142 may also include a drilling fluid flow modulator for communicating measurement and/or tool condition signals to the surface for detection and interpretation by a logging and control unit 126.

Figure 2:
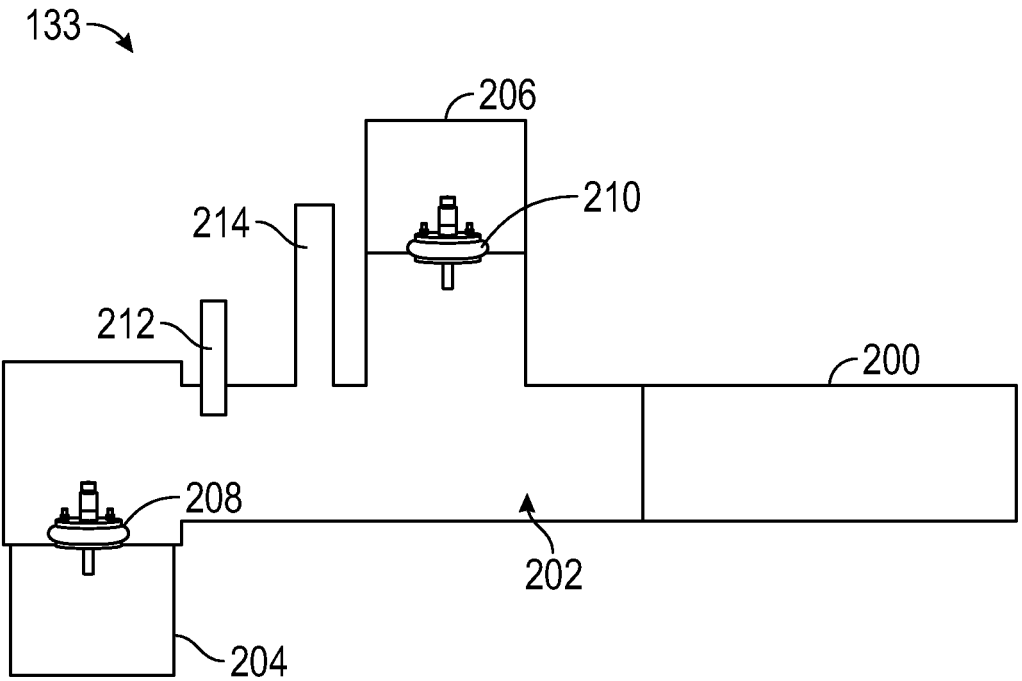
FIG. 2 illustrates a side, schematic view of a reciprocating piston mud pump including a first leak detection system, according to an embodiment.

FIG. 2 illustrates a side, schematic view of a reciprocating piston mud pump, according to an embodiment. The pump may be an example of the mud pump 133 discussed above with reference to FIG. 1, and thus the same reference number is used, although this is merely an example. Further, it will be appreciated that the view of FIG. 2 is greatly simplified for ease of description, as one of ordinary skill in the art will understand the basic operating principles and structures of such a pump; accordingly, description of the basic operating principles and structures are generally omitted for the sake of brevity, where appropriate.

The mud pump 133 may include a piston 200, a pump chamber 202, a suction inlet 204, and a discharge outlet 206. In at least one embodiment, the pump 133 may include three chambers and three pistons, or any other number thereof. However, for purposes of describing an embodiment of the present disclosure, a single chamber 202 and a single piston 200 are shown.

A suction valve 208 may control fluid entry into the pump chamber 202 from the suction inlet 204, and a discharge valve 210 may control fluid discharge from the pump chamber 202 to the discharge outlet 206. The piston 200 may be moved into and out of the pump chamber 202 by a driver (e.g., an electric motor, internal combustion engine, etc., which rotates a crankshaft). For example, as the piston 200 is drawn out of the chamber 202 (the "upstroke"), the available volume in the chamber 202 increases, thereby lowering the pressure therein. The suction valve 208 may be opened, e.g., in association with piston 200 position or directly in response to lowering pressure, allowing a working fluid to enter into the chamber 202 from the suction inlet 204. As the piston 200 is driven into the chamber 202 (the "downstroke"), the pressure of the working fluid in the chamber 202 increases, and, as the working fluid may be at least partially compressible, the volume in the chamber 202 may decrease. At some point, when a pressure reaches a high-pressure value or in response to piston 200 position, force on the piston 200, etc., the discharge valve 210 opens, allowing fluid to exit through the discharge outlet 206.

The pump 133 may include a first leak detection system. In this example, the leak detection system may include a pressure sensor 212 and a pressure port 214. The pressure sensor 212 may be configured to measure pressure within the pump chamber 202. For example, the pressure sensor 212 may be positioned in a housing containing the pump chamber 202. The pressure port 214 may be configured to receive pressurized fluid therethrough, e.g., to produce a desired pressure within the chamber 202, e.g., without moving the piston 200. This may be referred to as a static pressure test, as the pump 133 may not operate during such testing and the piston 200 may remain stationary.

In operation, the first leak detection system may be configured to measure the pressure in the pump chamber 202 over time with both valves 208, 210 closed and the piston 200 held stationary. For example, the pressure sensor 212 may measure pressure in the pump chamber 202 after a pressurized fluid is introduced therein via the pressure port 214. Measurements from the pressure sensor 202 may thus indicate whether the pressure chamber 202 is holding pressure, e.g., whether the suction valve 208 and/or discharge valve 210 are forming a seal or allowing leakage therethrough. In particular, pressure reducing over time may indicate leakage, and thus wear or other damage to one or both valves 208, 210.

In some embodiments, a baseline behavior may be determined for the pump 133. For example, the pressure effectively contained in the pump chamber 202 may be measured prior to employing the pump 133 in the field, or at another time at which the valves 208, 210 are assumed to be effectively sealing the chamber 202, or the pump 133 is otherwise operating within design constraints. In other embodiments, the baseline behavior may be obtained from a library or a manufacturer pressure specification. The baseline behavior may include the amount of time or the high pressure that the discharge valve 210 and the suction valve 208 are capable of maintaining in the pump chamber 202.

An in-use behavior may be taken at some point during the normal operation of the pump 133 in the field, and may similarly determine the pressure, and/or time at which a high pressure is, maintained within the pump chamber 202. The in-use behavior may be compared to the baseline behavior to determine whether the pump chamber 202 is holding pressure. Comparing the baseline behavior and in-use behavior may reveal potential valve leakage. For example, leakage across the discharge valve 210 and or the suction valve 208 may be inferred from a decrease in pressure over time, between the baseline and in-use behaviors, in the pump chamber 202 as measured by the pressure sensor 212.

Figure 3:
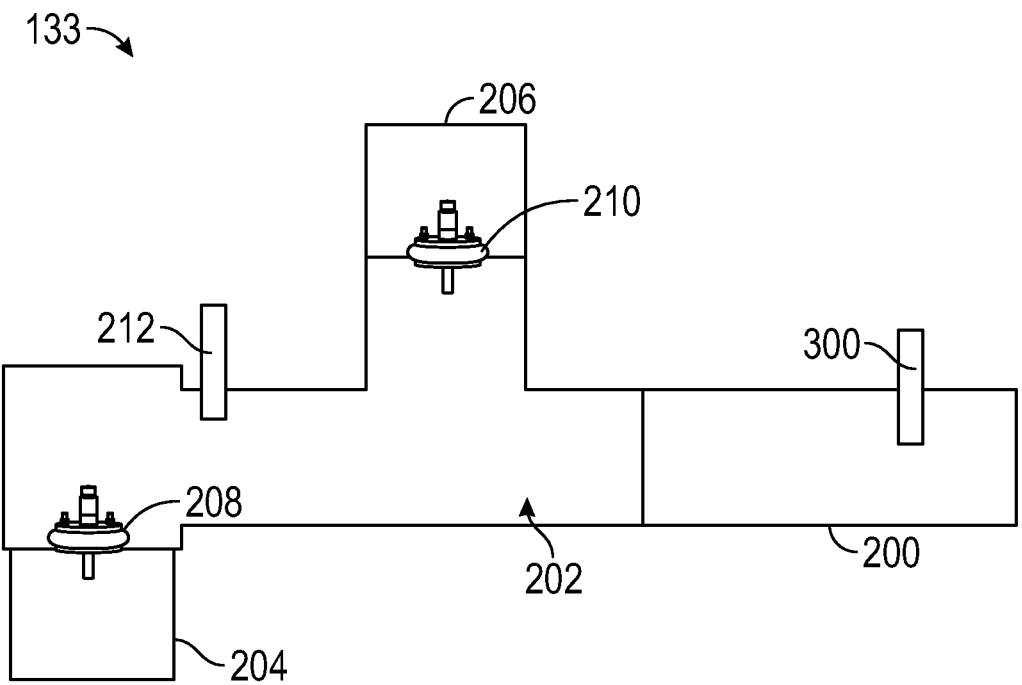
FIG. 3 illustrates a side, schematic view of a reciprocating piston mud pump including a second leak detection system, according to an embodiment.

FIG. 3 illustrates a simplified, side schematic view of the mud pump 133 including the piston 200, the pressure chamber 202, the discharge outlet 206, the suction inlet 204, the suction valve 208, and the discharge valve 210. The pump 133 of FIG. 3 may include a second leak detection system. For example, the second leak detection system may include the pressure sensor 212, which is configured to measure pressure in the pump chamber 202. In addition, the second leak detection system may include a piston position sensor 300.

The piston position sensor 300 may be configured to detect a position of the piston 200 with respect to the pump chamber 202. The piston position sensor 300 may, for example, measure crankshaft angle, from which the linear position of the piston 200 may be calculated. In another embodiment, the piston position sensor 300 may directly measure the linear progression of the piston 200 in the chamber 202. Further, measurements by the piston position sensor 300 may associated with a time (e.g., a timestamp). Likewise, measurements of the pressure sensor 212 may be associated with a time (e.g., a timestamp). Accordingly, the measurements of the pressure sensor 212 and the measurements of the piston position sensor 300 may be correlated based on time. In other embodiments, readings of the piston position sensor 300 may be taken simultaneously with readings of the pressure sensor 212, and the simultaneously-taken readings may be correlated directly with one another.

In either example, the pressure response of fluid in the pump chamber 202 to piston position 200 may be determined. In an embodiment, a baseline behavior, e.g., pressure response, may be determined prior to use of the pump 133 in the field, either by using the second leak detection system, or by reference to a library of pressure-responses for the pump 133. Subsequently, and in-use behavior, e.g., pressure response, may be determined using readings from the pressure sensor 212 and the piston position sensor 300 while deployed in the field. The pressure relationship to the piston position may be compared between the baseline behavior and the in-use behavior, and any deviation (or deviation beyond a predetermined threshold, etc.) therebetween may indicate leakage across one or both of the discharge valve 210 and the suction valve 208.

Figure 4:
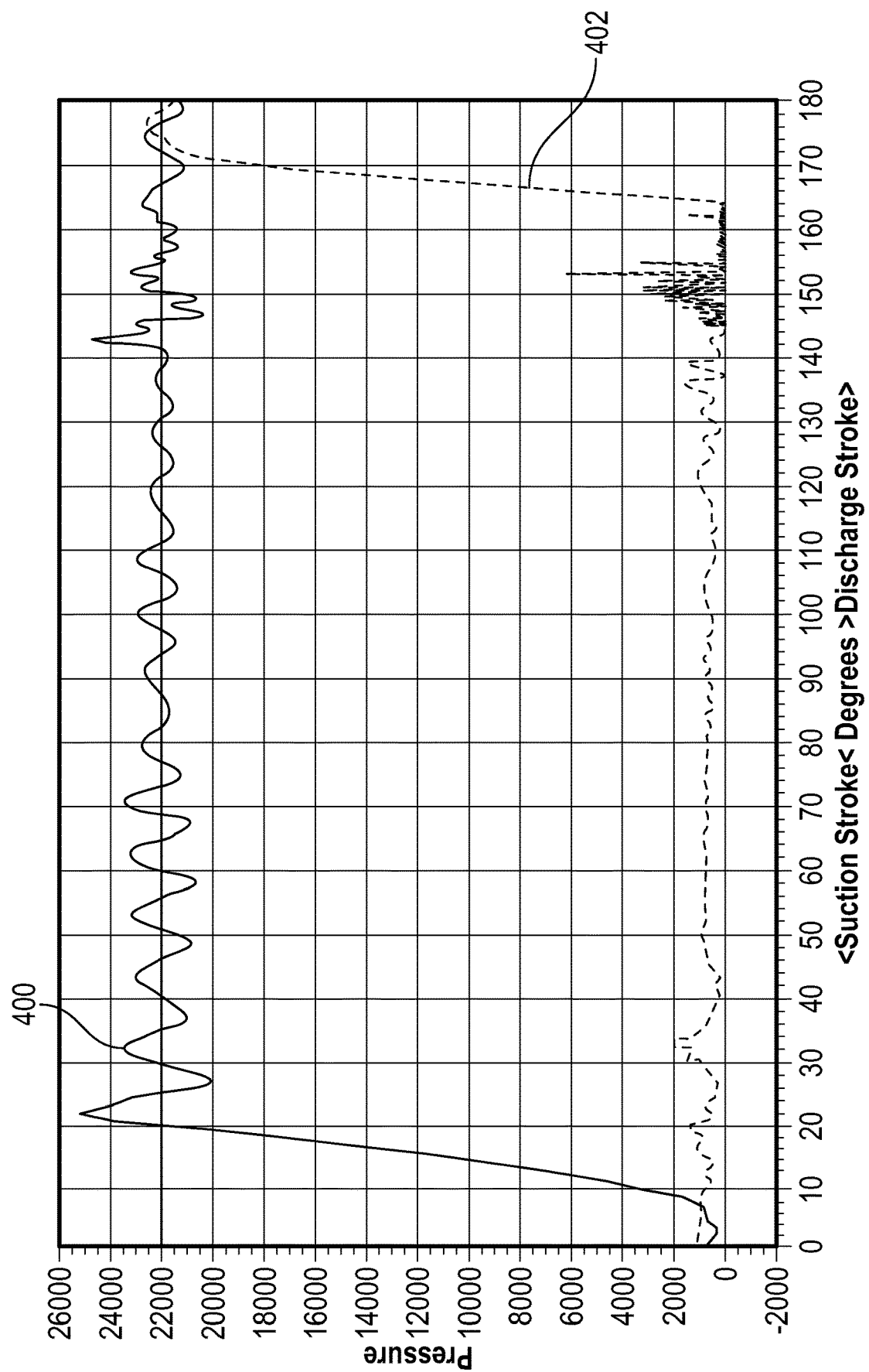
FIG. 4 illustrates a plot of a baseline pressure response to piston position, according to an embodiment.

FIG. 4 illustrates a baseline plot of a mud pump when the valves are not damaged, according to an embodiment. Line 400 represents the pressure inside the chamber 202 as the crank position moves from 0 to 180 deg (e.g., a forward stroke of the piston 200 or the discharge stroke) and line 402 represents the pressure in the chamber as the crank position moves from 180 deg to 360 deg (i.e. return stroke of the piston or the suction stroke). Such a baseline taken prior to deployment/use in the field (e.g., factory testing) may be compared with pressures seen during the field use of the mud pump 133. As the valves 208, 210 start to wear, the pressure may not build up to the same value (e.g., 22000 kPa) as seen in the baseline plots 400 or the valves 208, 210 may open and close at a different times when compared to the position of the piston. For example, any pressure-response lag or delay, reduced operating pressure, or the like may indicate potential leakage.

Figure 5A:
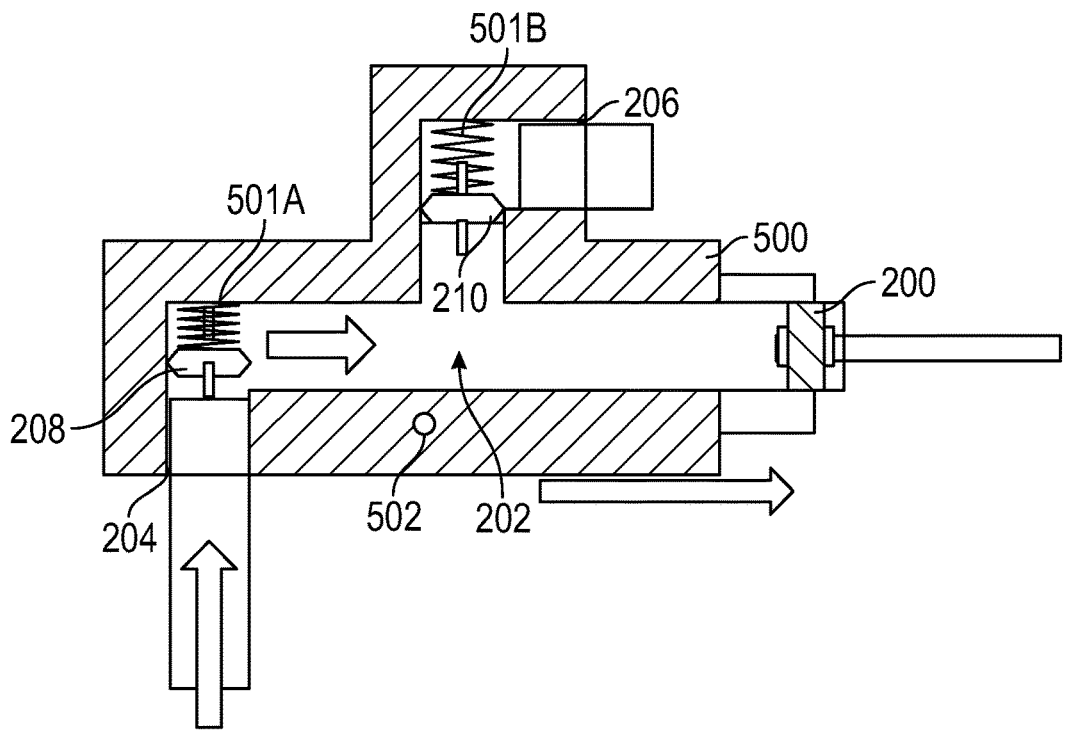
FIGS. 5A and 5B illustrate side, schematic views of a reciprocating piston mud pump including a third leak detection system, according to an embodiment.
Figure 5B:
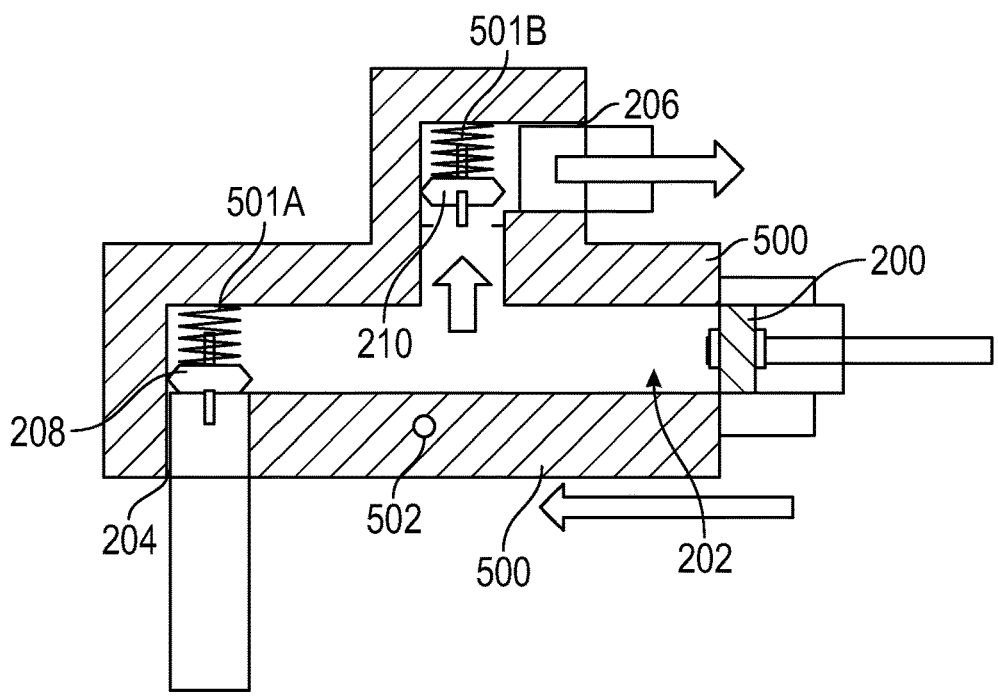

FIGS. 5A and 5B illustrate side, schematic views of the pump 133, including a third leak detection system, according to embodiment. The pump 133 includes the piston 200, the chamber 202, the suction inlet 204, the discharge outlet 206, the suction valve 208, and the discharge valve 210. In addition, the pump 133 includes a housing 500 in which the chamber 202 is defined. It will be appreciated that the other embodiments of the pump 133 discussed herein also include a housing, but the housing may be omitted in the other views for the sake of simplicity.

Further, the suction valve 208 may include a spring 501A, which biases the suction valve 208 closed. Likewise, the discharge valve 210 may include a spring 501B, which biases the discharge valve 210 closed. In this embodiment, fluid is discharged through the discharge valve 210 once the pressure applies a force on the valve 210 that overcomes the biasing force of the spring 501B, and similarly, fluid is received into the chamber 202 through the suction inlet 204 after the pressure in the chamber 202 drops sufficiently for the pressure of the fluid at the suction inlet 204 to overcome the spring 501A and open the suction valve 208.

In an embodiment, the third leak detection system includes a stress measurement device 502, e.g., a strain gauge (from which measurements stress may be calculated), an ultrasonic stress measurement device, or another stress measurement device. The stress measurement device 502 may be configured to measure (or permit calculation of) stress in or on the housing 500 in which the chamber 202 is defined. During an upstroke of the piston 200, as shown in FIG. 5A, the pressure in the chamber 202 may be reduced, the suction valve 208 may open and fluid may be received into the chamber 202 via the suction inlet 204. During this time, the pressure in the chamber 202 may be at a minimum, and thus stress as measured by the stress measurement device 502 in the housing 500 may likewise be at a minimum. As shown in FIG. 5B, during a downstroke of the piston 200, the pressure in the chamber 202 may increase. At some point during the downstroke, the discharge valve 210 opens, allowing fluid to exit from the chamber 202 via the discharge outlet 206, so as to generally maintain the high pressure in the chamber 202. This high pressure may generate a stress in the housing 500, which may be greater than is generated by the low pressure in the housing 500, e.g., during the upstroke of the piston 200.

Accordingly, the stress in the housing 500 measured by the stress measurement device 502, may be a function of the pressure in the chamber 202. Thus, similar to the leak detection systems described herein that directly measure pressure, the stress measurement device 502 may be used to recognize leakage in the pump 133, either dynamically or statically. For example, in operation, the stress measurements device 502 may be used to take a baseline behavior, for example, prior to deployment of the pump 133 into the fields. Using the measurements from the stress measurement device 502 and a piston position sensor (e.g., position sensor 300 of FIG. 3), a baseline behavior, e.g., stress response to piston position, may be determined. Subsequently, for example after deploying the pump 133 into the field, an in-use behavior may be determined using the stress measurement device 502. The in-use behavior may then be compared to the baseline behavior, such that any deviations in the stress response to the piston position may indicate potential leakage across one or both of the discharge valve 210 and/or the suction valve 208.

In greater detail, in an embodiment, the relationship between the chamber 202 pressure and the stress on the housing 500 is given by the equation:

$$T = \frac{P \times R}{K \times h}, \quad (1)$$

where "T" is the stress experienced by the housing 500 wall that defines the chamber 202, "P" is the internal pressure within the chamber 202, "R" is the radius of the chamber 202, "h" is the wall thickness of the housing 500, and "k" is proportionality constant.

A change in stress from current state "T2" to previous stress state "T1" can be expressed as:

$$T2 - T1 = \Delta T = \frac{R}{K \times h} \times (\Delta P), \quad (2)$$

For a compressible fluid like the drilling fluid, a change is pressure is given by the equation:

$$\Delta P = B \times \left(\frac{\Delta V}{V}\right), \quad (3)$$

where "B" is the bulk modulus of the fluid, "ΔV" is the change in the volume for a known volume "v" due to a change in pressure "ΔP."

For a known dimension of the pump chamber 202, the change in volume can be change in piston 200 position and equation 3 can be rewritten as $$dP = B \times \left(\frac{\Delta d}{D}\right), \quad (4)$$

where "D" is the total displacement of the piston and "Δd" is change in displacement of the piston for the observed pressure.

Since the valves 208, 210 are mounted on springs 501A, 501B, an additional pressure "Ps," generated by the springs 501A, 501B is given by the following equation, and is overcome for the valve to open $$Ps = \frac{Ks \times l}{A}, \quad (5)$$

where "Ks" is the spring constant, "l" is the change in length of spring and "A" is the area occupied by the spring on the valve Thus, by measuring the stress on the walls of the housing 500 of the fluid chamber 202, the opening or closing of the valves 208, 210 can be detected. By monitoring the changing value of stress and pumping pressure, any deviation may indicate a change in valve condition, e.g., potential valve leakage.

Figure 6:
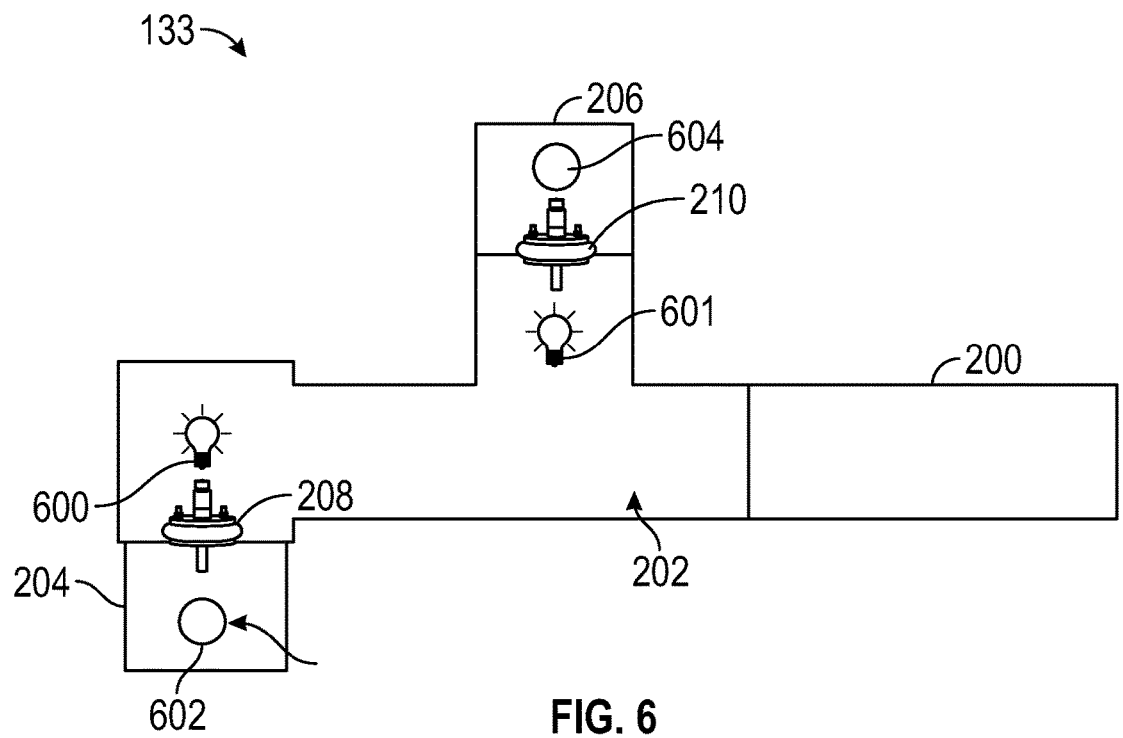
FIG. 6 illustrates a side, schematic view of a reciprocating piston mud pump including a fourth leak detection system, according to an embodiment.

FIG. 6 illustrates a side, schematic view of the pump 133, including a fourth leak detection system, according to an embodiment. The fourth leak detection system may include one or more light sources (two shown: 600, 601) and one or more light sensors (two shown: 602, 604). The light sources 600, 601 may be positioned on opposite sides of the valves 208, 210, respectively, from the light sensors 602, 604. For example, the light sources 600, 601 may be positioned within the chamber 202, while the light sensors 602, 604 may be positioned on an opposite side of the suction valve 208 and the discharge valve 210 from the light source 600, respectively. However, in another embodiment, the light sources 600, 601 may be positioned outside the chamber 202, while the sensors 602, 604 may be positioned within the chamber 202. In particular, the light sensor 602 and the light source 600 may be positioned such that, when the suction valve 208 opens, light from the light source 600 reaches the light sensor 602. Similarly, light sensor 604 and light source 601 may be positioned such that, when the discharge valve 210 opens, light from the light source 601 reaches the light sensor 604.

When sealing properly, the suction valve 208 may block the light from the light source 600 from reaching the light source 600 when the suction valve 208 is closed. When open, the suction valve 208 may permit passage of the light from the light source 600 to the light sensor 602. Similarly, when open, the discharge valve 210 may permit light from the light source 601 from reaching the light sensor 602, and when closed and sealing properly, the discharge valve 210 may block the light from the light source 601 from reaching the light sensor 602.

In an embodiment, the light sources 600, 601 may be continuously on. As such, when the valves 208, 210 open, the sensors 602, 604 may detect light. Thus, a baseline behavior, e.g., a time during a cycle of operation at which light is detected, may be recorded, e.g., when the valves 208, 210 are assumed to be operating properly, have not yet been used in the field, or the pump 133 is otherwise operating within design constraints. Subsequently, in-use behavior may be established by monitoring when light is detected by the light sensors 602, 604. As the valves 208, 210 wear, for example, light may be able to pass the valves 208, 210 and be detected by the light sensors 602, 604 when the valves 208, 210 are closed. Further, a greater amount of light (in terms of time, luminosity, etc.) may be associated with a greater amount of wear (or other damage) to the valve 208, 210, which may in turn indicate that the valves 208, 210 are failing to fully seal and thus allowing fluid leakage when closed.

In another embodiment, the light sources 600, 601 may be timed (strobed) to be on only when the valves 208, 210 are closed, respectively. Thus, a baseline behavior may be that no light is detected by the sensors 602, 604, as the light may be turned on when the valves 208, 210 are closed, and turned off prior to opening the valves 208, 210. An in-use behavior may include detecting light, as the valves 208, 210 wear or are otherwise damaged and allow light to pass through even in the closed position. The in-use behavior may thus be a binary determination of whether light is detected or not, or may provide a value associated with the duration or amount of light that is recorded, e.g., to provide an indication of how much wear or damage to the associated valve 208, 210 has occurred. Further, it will be appreciated that the fourth leak detection system may be capable of identifying which of the valves 208, 210 is worn or damaged, or that both are worn or damaged.

Figure 7:
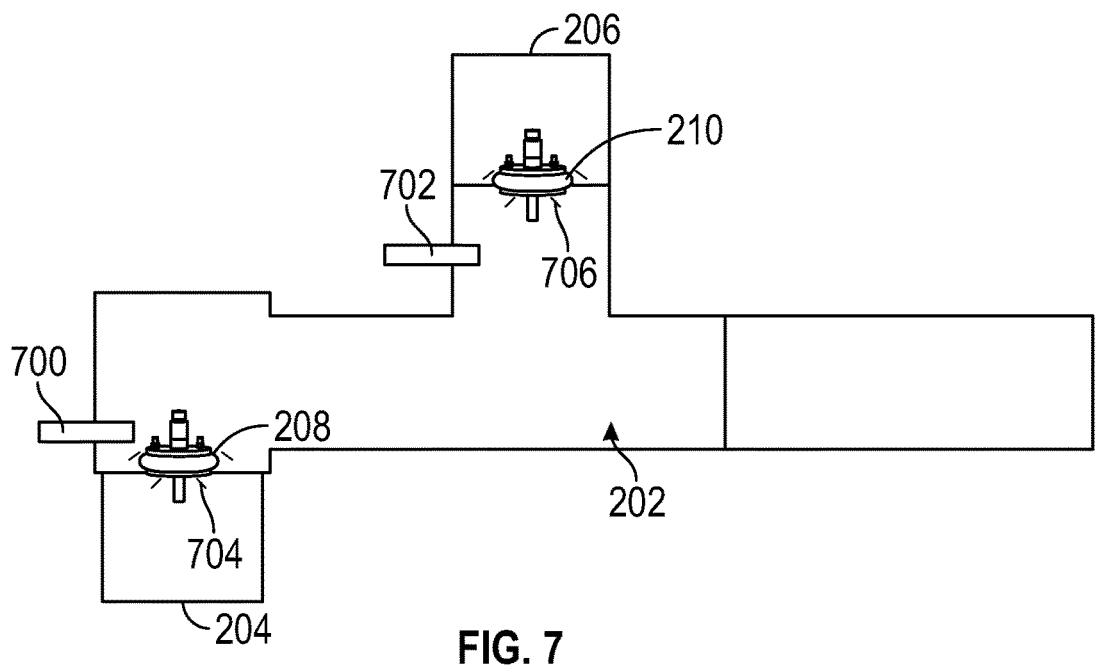
FIG. 7 illustrates a side, schematic view of a reciprocating piston mud pump including a fifth leak detection system, according to an embodiment.

FIG. 7 illustrates a side, schematic view of the pump 133 including a fifth leak detection system, according to an embodiment. The fifth leak detection system may include vibration sensors 700, 702, positioned proximal to the valves 208, 210, respectively. Further, the fifth leak detection system may include one or more flow features 704, 706 e.g., a device that generates vibration in response to fluid flow therepast. Such flow features 704 may include any device that is susceptible or sensitive to flow-induced vibration. Examples of the flow features 704 include thin beams, fins, membranes or an array/combination of them. The flow features 704, 706 may be positioned at or proximal to the suction and discharge valves 208, 210, respectively.

When the valves 208, 210 are closed, if the valves 208, 210 are not damaged or worn, the valves 208, 210 may prevent fluid flow therepast. As such, the flow features 704, 706 may generally not generate vibrations. When the valves 208, 210 are opened, the flow features 704, 706 may generate vibrations. Further, when the valves 208, 210 are worn or otherwise damaged, leakage fluid flow while the valves 208, 210 are closed may be produced, causing the flow features 704, 706 to generate vibrations that can be recorded by the vibration sensors 700, 702.

Accordingly, a baseline behavior for the valves 208, 210 may be established, e.g., when the valves 208, 210 are assumed to be operating properly. Background vibrations or other vibrations not generated by leakage flow past the flow features 704, 706 may be detected while the valves 208, 210 are closed, by the vibration sensors 700, 702. Subsequently, in-use behavior for the valves 208, 210 may be established and compared to the baseline behavior. Differences between the baseline behavior and the in-use behavior in vibrations detected by the vibration sensors 700, 702, e.g., when the valves 208, 210 are worn, may indicate leakage flow. In addition, the vibration detectors 700, 702, because of their positioning, may be able to distinguish between leakage past the suction valve 208 and leakage past the discharge valve 210.

Figure 8:
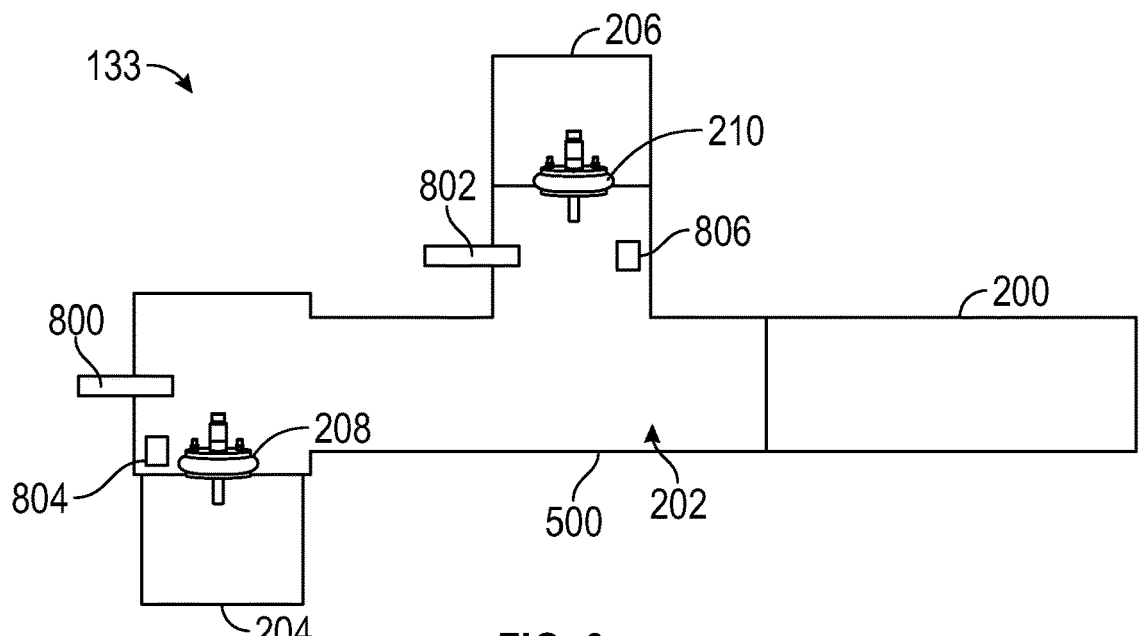
FIG. 8 illustrates a side, schematic view of a reciprocating piston mud pump including a sixth leak detection system, according to an embodiment.

FIG. 8 illustrates a side, schematic view of the pump 133 including a sixth leak detection system, according to an embodiment. The sixth leak detection system may measure the resonant frequency of the valves 208, 210 to determine wear or damage thereto. For example, the sixth leak detection system may include vibration sensors 800, 802 for each of the valves 208, 210. The vibration sensors 800, 802 may be configured to detect the resonant frequency at which the respective valves 208, 210 vibrate. The sixth leak detection system may further include impact devices 804, 806, which may be configured to initiate a resonant response in the valves 208, 210, e.g., by directly impacting the individual valves 208, 210 or impacting the housing 500 near the valves 208, 210. In an embodiment, the impact devices 804, 806 may be omitted, and the impact that occurs when the valves 208, 210 reach open and/or closed positions may be used to generate the resonant response in the valves 208, 210.

Accordingly, a baseline behavior may be a resonant frequency of the valves 208, 210 measured by the vibration sensors 800, 802 before use, or otherwise when the valves 208, 210 are assumed to be working properly (i.e., not allowing unacceptable amounts of leakage). This measurement may be taken when the pump 133 is operational (i.e., pumping) or when the pump 133 is not operating. Subsequently, in-use measurements of the resonant frequency (either while the pump 133 is operating or not) may be compared to the baseline measurement, with any differences potentially being attributable to the valve 208, 210 having worn or been damaged.

Figure 9:
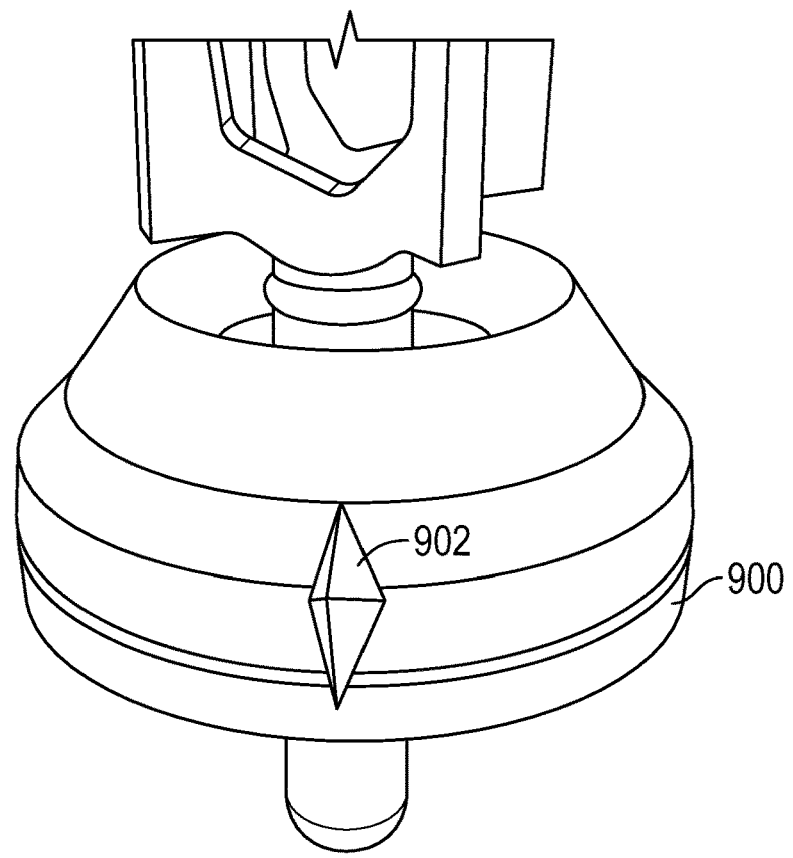
FIG. 9 illustrates a valve element of a reciprocating piston mud pump including an embedded marker of a seventh leak detection system, according to an embodiment.

FIG. 9 illustrates a perspective view of a valve element 900, e.g., a plug valve element that may be used for either or both of the valves 208, 210, according to an embodiment. The valve element 900 may include a tapered profile that is configured to engage and seal with a valve seat when the valve thereof is closed.

The valve element 900 may provide at least a portion of a seventh leak detection system. For example, the valve element 900 may include one or more markers 902 therein. The markers 902 may be made from one or more materials that are detectable in the fluid that is pumped in the pump 133, e.g., downstream from the discharge outlet 206, e.g., referring to FIG. 1, between the pump 133 and the swivel 122. Such materials may be detected chemically, by radioactivity, and/or optically. For example, the marker may be a chemical substance that dissolves and/or suspends in the fluids. Sensors may be configured to detect the presence of the chemical in the fluid. Further, in some embodiments, the marker may remain chemically stable when in the original medium (embedded in the valve element 900), but may initiate a chemical reaction when in contact with an alternative medium (the fluid), and the sensors may detect such reaction. In another embodiment, the markers 902 may be radioactive, and can be detected as they pass through a sensor location downstream from the pump. In yet another embodiment, the markers 902 may be of a specific size, shape, material, color, and/or finish, and the detecting sensor may rely on light-of-sight to detect the particles using a laser, ultrasound, and/or the like.

The markers 902 may be at least partially embedded in the valve element 900. As the valve element 900 wears, however, more and more of the marker 900 may be exposed, and thereby released into the fluid for detection downstream. In an embodiment, the marker 900 may include two or more layers of different materials, e.g., with one of the materials being farther embedded than the other, such that progressive wear may be detected based on which material is present in the fluid downstream.

Accordingly, a baseline behavior of the valve 208, 210 may be to release no marker material into the fluid, or release a specific type of marker into the fluid. An in-use behavior of the valve 208, 210, e.g., after a certain amount of wear, may include releasing marker material into the fluid, or releasing a different type of marker fluid, in the case that there are two or more materials.

Figure 10:
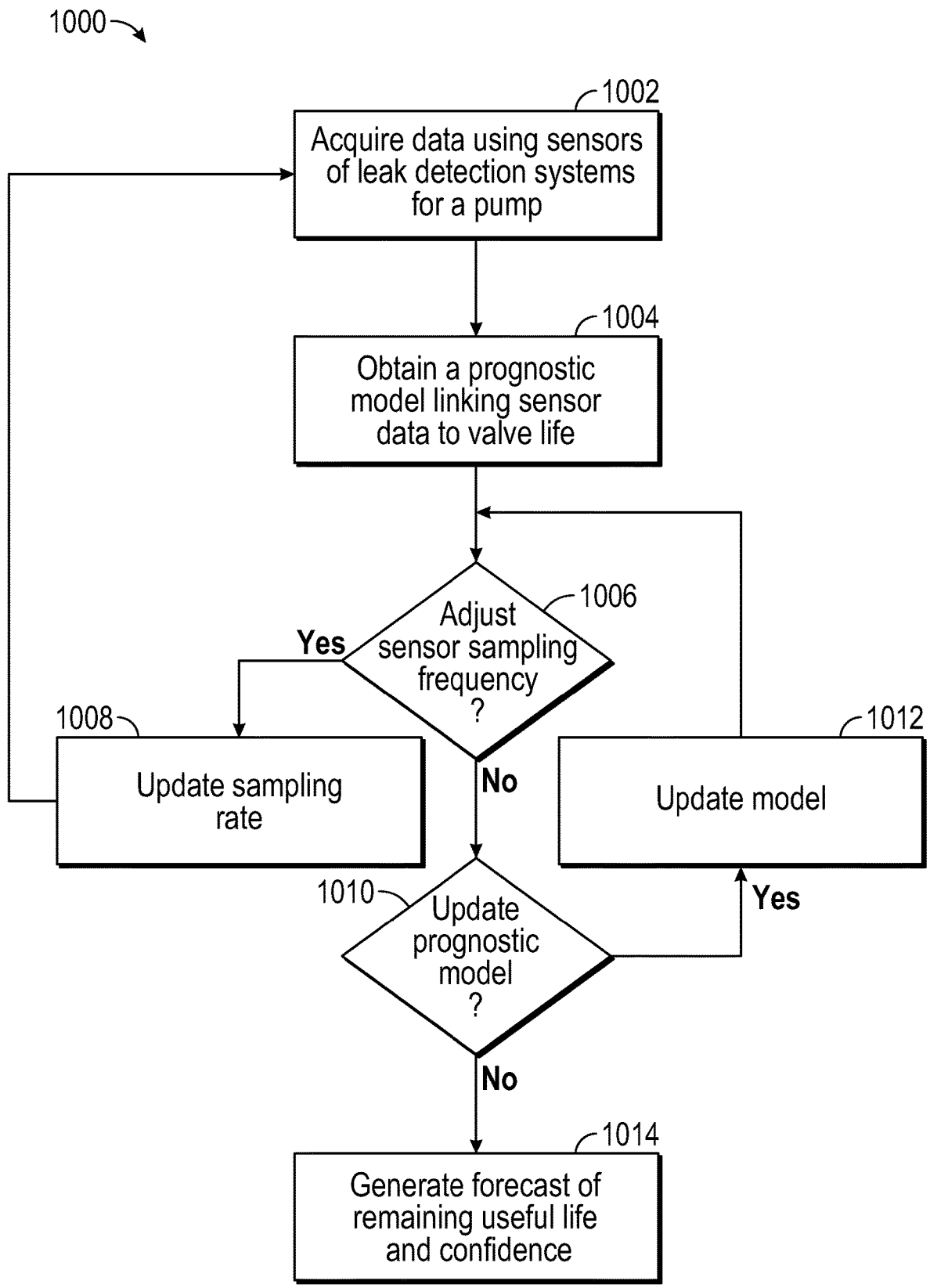
FIG. 10 illustrates a flowchart of a method for detecting valve leakage, according to an embodiment.

FIG. 10 illustrates a flowchart of a method 1000 for using a prognostic model to determine valve 208, 210 integrity and/or to forecast when a valve 208, 210 may fail or otherwise be replaced, according to an embodiment. The method 1000 may include acquiring data using any of the sensors disclosed herein, as at 1002, e.g., according to any one or more of the leak detection systems discussed above. The method 1000 may also include obtaining a prognosis model, as at 1004 which may link the sensor data to a wear rate, wear amount, or otherwise to the useful life of a valve 206, 210, or a component thereof (e.g., a seal). The prognostic model may be generated based on prior use data from similar pumps 133, for example.

The method 1000 may further include determining whether to adjust a sampling rate of the sensors, as at 1006. For example, periodically, a sweep of sensor frequency sampling rates may be conducted, in which a given sensor may be sampled at a plurality of different frequencies, in order to determine a threshold between sampling rates that are too slow and miss characteristics of the behavior being monitored, and sampling rates that are too fast and unnecessarily use computing resources. The leak detection systems discussed above use a variety of different sensors to measure various different behaviors; thus, the sampling rates for these sensors may not be the same. Accordingly, the sensors may be swept individually to determine separate sampling frequencies. If the sample rate for a sensor is to be adjusted, it may be updated (frequency increased or decreased), as at 1008.

If the sampling rate is sufficient, the method 1000 may proceed to determining whether the prognostic model is adequate, as at 1010. In some embodiments, this may be a manual determination, comparing the results or forecasts of the model to the physical reality of the integrity of the valves 208, 210. In another embodiment, the forecast prognosis (e.g., when the valve 208, 210 is expected to fail) may be compared to when failure actually occurs, libraries of historical usage/failure, etc. The model may be updated automatically, e.g., as part of a machine-learning algorithm, as at 1012.

The method 1000 may then forecast a remaining useful life, as well as providing a confidence for this forecast, as at 1014. The confidence may be determined at least partially based on a number of the leak detection systems that indicate failure, e.g., as a voting system, such that malfunctioning of one leak detection system does not automatically indicate failure. The confidence level may also be affected by the confidence or uncertainty of the underlying prognostic model, e.g., based on the amount of training data fed to it, and how closely the present sensor readings/trends match the historical training data.

Figure 11:
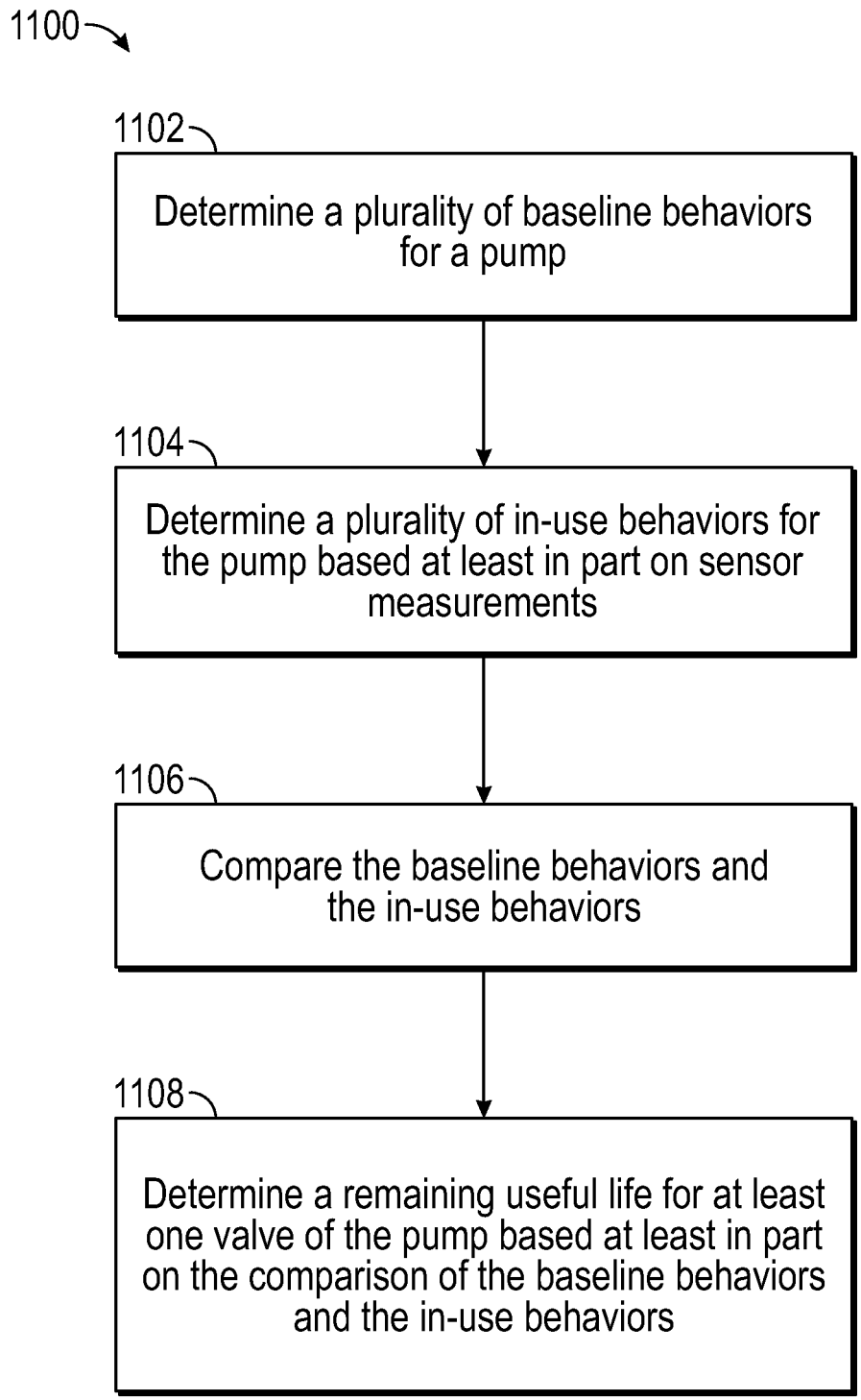
FIG. 11 illustrates another flowchart of a method for detecting valve leakage, according to an embodiment.

FIG. 11 illustrates a flowchart of a method 1100 for detecting valve integrity in a mud pump, according to an embodiment. The method 1100 may proceed by using two or more of the leak detection systems discussed above, and thus those leak detection systems should not be considered mutually exclusive. Rather, the method 1100 may, for example, use two or more of the leak detection systems for redundancy or otherwise to improve confidence in a determination that a valve is or is not worn or otherwise damaged. Accordingly, the method 1100 is described herein with reference to the embodiments of the pump 133 discussed above, but is not limited to any particular embodiment or combination thereof.

The method 1100 may include determining a plurality of baseline behaviors for one or more valves 208, 210 of a pump 133, as at 1102. The baseline behaviors may be measured using one or more sensors (e.g., one or more of sensors 212, 300, 502, 602, 604, 700, 702, 800, 802) of the pump 133, or may be obtained from databases, manufacturer specifications, combinations thereof, etc.

The method 1100 may also include determining a plurality of in-use behaviors for the one or more valves 208, 210 of the pump 133, as at 1104. Each of the plurality of in-use behaviors may be determined based on one or more measurements from one or more sensors (e.g., sensors 212, 300, 502, 602, 604, 700, 702, 800, 802).

The method 1100 may include comparing the in-use and baseline behaviors, as at 1106. In an embodiment, the method 1100 may include determining, based on the comparison of the in-use behaviors to the baseline behaviors, a remaining useful life of at least one of the one or more valves, as at 1108. This determination may be made based on a prognostic model that links the determined behaviors (or differences therebetween) to the remaining useful life of the valves 208, 210. In some examples, the remaining useful life determination may be binary, e.g., valve element needs replacing or not. In others, the remaining useful life may specify a forecasted amount of time, number of cycles, etc., before an expected failure or the like.

In an embodiment, the method 1100 may include replacing at least a portion of the at least one of the one or more valves 208, 210 in response to the remaining useful life determination, as at 1108.

The method 1100 may employ two or more of several different leak detection systems. For example, in an embodiment, determining the baseline behaviors at 1102 includes performing a first static pressure test of a chamber 202 of the pump 133, the chamber being sealed using the valves. In this example, at least one of the baseline behaviors includes a first pressure drop rate in the chamber. Further, determining the in-use behaviors at 1104 may include performing a second static pressure test of the pressure chamber 202. Accordingly, at least one of the in-use behaviors comprises a second pressure drop rate in the pressure chamber. Comparing at 1106 may thus include comparing the first and second pressure drop rates. Further, determining at 1108 may be at least partially based on the second pressure drop rate being greater than the first pressure drop rate.

In an embodiment, the leak detection system may employ a dynamic pressure test. For example, determining at 1102 may include measuring a first pressure in a chamber 202 of the pump 133, measuring a first position of a piston 200 in the chamber 202, associating the first position with the first pressure, and determining a baseline pressure response to piston position based at least in part on the associated position and pressure. Further, determining at 1104 may include measuring a second pressure in the chamber 202, measuring a second position of the piston 200 in the chamber 202, and determining an in-use pressure response to piston position based at least in part on the associated second position and second pressure. Accordingly, comparing at 1106 may include comparing the baseline and in-use pressure responses, and determining at 1108 may be at least partially based on any differences between the baseline and in-use pressure responses.

In an embodiment, determining the baseline behaviors at 1102 includes measuring a baseline stress in a housing 500 of the pump 133. Further, determining the in-use behaviors at 1104 includes measuring an in-use stress in the housing 500 of the pump 133. Accordingly, comparing at 1106 comparing the baseline stress to the in-use stress. Determining at 1108 may thus be at least partially based on differences between the baseline stress and the in-use stress.

In an embodiment, the method 1100 may additionally include emitting a light from one side of at least one of the one or more valves 208, 210, toward an opposite side of the at least one of the one or more valves 208, 210. The one or more valves 208, 210 are configured to at least partially obstruct the light when the one or more valves 208, 210 are closed and at least partially permit passage of the light when the valves 208, 210 are open. In such an embodiment, determining the baseline behaviors at 1102 may include determining when the light passes the valve 208, 210, and determining the in-use behaviors at 1104 may include determining when the light passes the valve 208, 210. Further, comparing at 1106 may include comparing when the light passes the valve 208, 210 in the in-use behavior with when the light passes the valve 208, 210 in the baseline behavior. In at least one embodiment, emitting the light includes emitting the light only when the at least one of the one or more valve 208, 210 is closed.

In an embodiment, the method 1100 may also include causing a vibration response to fluid flow past at least one of the one or more valves, e.g., by providing one or more flow features 704, 706. In such an embodiment, determining the baseline behaviors at 1102 may include measuring a first vibration proximal to the at least one of the one or more valves 208, 210 when the at least one of the one or more valves 208, 210 is closed, determining the in-use behaviors at 1104 may include measuring a second vibration proximal to the at least one of the one or more valves 208, 210 when the at least one of the one or more valves 208, 210 is closed. Further, comparing at 1106 may include comparing the first and second vibrations.

In an embodiment, the method 1100 may additionally causing the at least one of the one or more valves 208, 210 to resonate. This may be accomplished by impacting the valve 208, 210, an area proximal to the valve 208, 210 (e.g., part of the housing 500), or by opening or closing the valve 208, 210. Accordingly, determining at 1102 may include measuring a first resonant frequency of the one of the valves 208, 210, and determining at 1104 may include measuring a second resonant frequency of the one or more valves 208, 210. Comparing at 1106 may include comparing the first and second resonant frequencies.

In an embodiment, the method 1100 may include embedding one or more markers 902 within a valve element 900 of at least one of the one or more valves 208, 210. The marker 900 includes a material that is detectable in a fluid pumped by the pump 133. The material is released into the fluid in response to the valve element 900 being worn. Accordingly, determining at 1102 may include determining a first amount of the material present in the fluid downstream from the pump 133. Determining at 1104 may include determining a second amount of the material present in the fluid downstream from the pump. Comparing at 1106 may include comparing the first and second amounts of the material of the marker 902 in the fluid downstream from the pump 133.

In an embodiment, the marker 902 may include a plurality of different materials that are successively released into the fluid pumped by the pump 133 in response to the valve element 900 being worn. In such an embodiment, determining at 1102 includes determining one or more first amounts of one or more of the plurality of different materials found in the fluid. Further, determining at 1104 includes determining one or more second amounts of one or more of the plurality of different materials found in the fluid. Comparing at 1106 may include comparing the one or more first amounts and the one or more second amounts.

In an embodiment, the method 1100 may be employed with a prognostic model, as discussed above with respect to method 1000. Accordingly, the method 1100 may provide a remaining useful life, as well as a confidence level in the determination of the remaining useful life. The confidence level may be based at least in part on a number of in-use behaviors that differ from the baseline behaviors.

Further, the method 1100 may include determining a sampling rate for the one or more sensors from which at least the in-use behaviors are determined. For example, determining the sampling rate may include performing a sweep of different sampling frequencies for each of the one or more sensors.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 12:
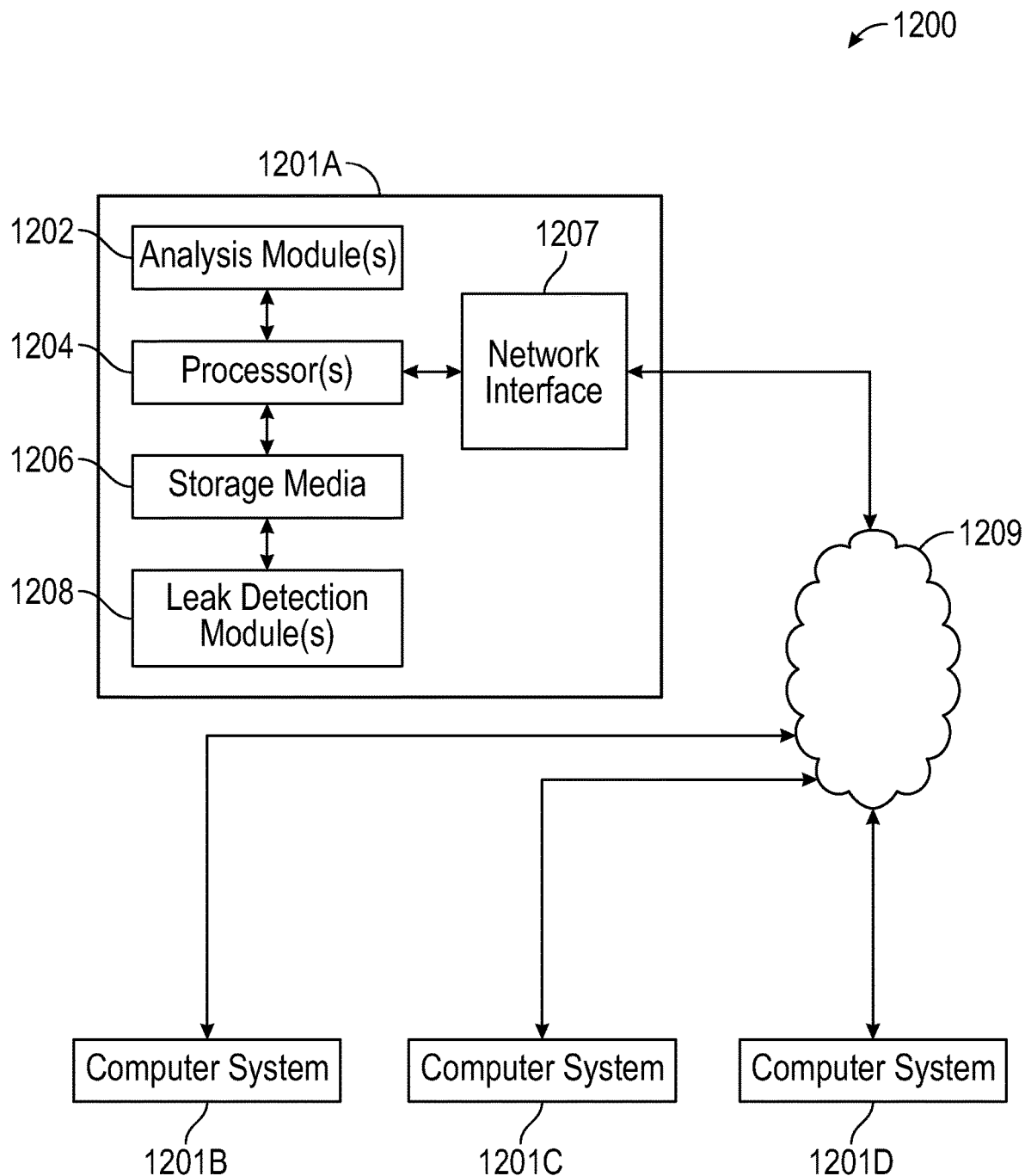
FIG. 12 illustrates a computing system for performing one or more aspects of the method, according to an embodiment.

In some embodiments, any of the methods of the present disclosure may be executed by a computing system. FIG. 12 illustrates an example of such a computing system 1200, in accordance with some embodiments. The computing system 1200 may include a computer or computer system 1201A, which may be an individual computer system 1201A or an arrangement of distributed computer systems. The computer system 1201A includes one or more analysis module(s) 1202 configured to perform various tasks according to some embodiments, such as one or more methods disclosed herein. To perform these various tasks, the analysis module 1202 executes independently, or in coordination with, one or more processors 1204, which is (or are) connected to one or more storage media 1206. The processor(s) 1204 is (or are) also connected to a network interface 1207 to allow the computer system 1201A to communicate over a data network 1209 with one or more additional computer systems and/or computing systems, such as 1201B, 1201C, and/or 1201D (note that computer systems 1201B, 1201C and/or 1201D may or may not share the same architecture as computer system 1201A, and may be located in different physical locations, e.g., computer systems 1201A and 1201B may be located in a processing facility, while in communication with one or more computer systems such as 1201C and/or 1201D that are located in one or more data centers, and/or located in varying countries on different continents).

A processor can include a microprocessor, microcontroller, processor module or subsystem, programmable integrated circuit, programmable gate array, or another control or computing device.

The storage media 1206 can be implemented as one or more computer-readable or machine-readable storage media. Note that while in the example embodiment of FIG. 12 storage media 1206 is depicted as within computer system 1201A, in some embodiments, storage media 1206 may be distributed within and/or across multiple internal and/or external enclosures of computing system 1201A and/or additional computing systems. Storage media 1206 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1200 contains one or more leakage detection module(s) 1208. In the example of computing system 1200, computer system 1201A includes the leakage detection module 1208. In some embodiments, a single leakage detection module may be used to perform some or all aspects of one or more embodiments of the methods. In alternate embodiments, a plurality of leakage detection modules may be used to perform some or all aspects of methods.

It should be appreciated that computing system 1200 is only one example of a computing system, and that computing system 1200 may have more or fewer components than shown, may combine additional components not depicted in the example embodiment of FIG. 12, and/or computing system 1200 may have a different configuration or arrangement of the components depicted in FIG. 12. The various components shown in FIG. 12 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Data interpretation processes may be refined in an iterative fashion; this concept is applicable to embodiments of the present methods discussed herein. This can include use of feedback loops executed on an algorithmic basis, such as at a computing device (e.g., computing system 1200, FIG. 12), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for controlling a pump in a drilling system, the method comprising:
   determining baseline behaviors for one or more valves of the pump;

determining in-use behaviors for the one or more valves of the pump, wherein each of the in-use behaviors are determined based on one or more measurements from one or more sensors;

comparing the in-use behaviors and the baseline behaviors;

forecasting, based on the comparison of the in-use behaviors and the baseline behaviors, a remaining useful life of at least one of the one or more valves;

emitting a light from one side of at least one of the one or more valves toward an opposite side of the at least one of the one or more valves, wherein the one or more valves are configured to at least partially obstruct the light when the at least one of the one or more valves is closed and at least partially permit passage of the light when the at least one of the one or more valves is open;

wherein determining the baseline behaviors comprises determining when the light passes the at least one of the one or more valves; and wherein determining the in-use behavior comprises determining when the light passes the at least one of the one or more valves; and comparing the baseline behaviors and the in-use behaviors comprises comparing when the light passes the at least one of the one or more valves for the in-use behavior with when the light passes the at least one of the one or more valves in the baseline behavior, wherein emitting the light comprises strobing the light such that the light is on only when the at least one of the one or more valves is closed, and wherein the at least one of the one or more valves is repeatedly opened and closed when in-use.

2. The method of claim 1, further comprising replacing at least part of the at least one of the one or more valves in response to forecasting the remaining useful life.

3. The method of claim 1, further comprising:
determining a confidence level in the determination that at least one seal is worn based on at least one in-use measured value that differs from at least one baseline measured value, or based on an amount by which one or more in-use measured values differ from one or more baseline measured values corresponding thereto, or a combination thereof.

4. The method of claim 1, further comprising determining a sampling rate for the one or more sensors from which the in-use behaviors are determined wherein determining the sampling rate comprises performing a sweep of different sampling frequencies for each of the one or more sensors.

5. A system for pumping fluid into a well, the system comprising:
a pump comprising one or more valves;
a leakage detection system coupled to the pump and comprising one or more sensors and a light source positioned on one side of at least one of the one or more valves and directed toward an opposite side of the at least one of the one or more valves, wherein the at least one of the one or more valves is configured to at least partially obstruct light from the light source when the at least one of the one or more valves is closed and at least partially permit passage of the light when the at least one of the one or more valves is open, wherein the light source is strobed to be on only when the at least one of the one or more valves is closed, and wherein the at least one of the one or more valves is repeatedly opened and closed when in-use; and
a processor coupled to the leakage detection system, the processor configured to perform operations by executing computer-readable instructions stored on a non-transitory computer-readable medium, the operations comprising:

determining baseline behaviors for the one or more valves by determining when the light passes the at least one of the one or more valves;

determining in-use behaviors for the one or more valves by determining when the light passes the at least one of the one or more valves, wherein each of the in-use behaviors is determined based on one or more measurements from the one or more sensors;

comparing the in-use behaviors and the baseline behaviors by comparing when the light passes the at least one of the one or more valves for the in-use behavior with when the light passes the at least one of the one or more valves in the baseline behavior; and forecasting, based on the comparison of the in-use behaviors and the baseline behaviors, a remaining useful life of at least one of the one or more valves.

6. The system of claim 5, further comprising determining when to replace at least part of the at least one of the one or more valves in response to forecasting the remaining useful life.

7. The system of claim 5, further comprising:
determining a confidence level in the determination that at least one seal is worn based on (i) at least one in-use measured value that differs from at least one baseline measured value, (ii) an amount by which one or more in-use measured values differ from one or more baseline measured values corresponding thereto, or (iii) a combination thereof.

8. The system of claim 5, further comprising determining a sampling rate for the one or more sensors from which the in-use behaviors are determined, wherein determining the sampling rate comprises performing a sweep of different sampling frequencies for each of the one or more sensors.

9. A non-transitory, computer-readable medium storing instructions that, when executed by at least one processor of a computing system, cause the computing system to perform operations, the operations comprising:
determining baseline behaviors for one or more valves of a pump, wherein the baseline behaviors comprise determining when light passes at least one of the one or more valves, wherein a light from one side of the at least one of the one or more valves is emitted toward an opposite side of the at least one of the one or more valves, wherein the one or more valves are configured to at least partially obstruct the light when the at least one of the one or more valves is closed and at least partially permit passage of the light when the at least one of the one or more valves is open;

determining in-use behaviors for the one or more valves of the pump, wherein each of the in-use behaviors are determined based on one or more measurements from one or more sensors;

comparing the in-use behaviors and the baseline behaviors, wherein comparing the baseline behaviors and the in-use behaviors comprises comparing when the light passes the at least one of the one or more valves for the in-use behavior with when the light passes the at least one of the one or more valves in the baseline behavior, wherein the light is strobed such that the light is on only when the at least one of the one or more valves is closed, and wherein the at least one of the one or more valves is repeatedly opened and closed when in-use; and forecasting, based on the comparison of the in-use behaviors and the baseline behaviors, a remaining useful life of at least one of the one or more valves.

10. The non-transitory, computer-readable medium of claim 9, further comprising determining when to replace at least part of the at least one of the one or more valves in response to forecasting the remaining useful life.

11. The non-transitory, computer-readable medium of claim 9, further comprising:
   determining a confidence level in the determination that at least one seal is worn based on (i) at least one in-use measured value that differs from at least one baseline measured value, (ii) an amount by which one or more in-use measured values differ from one or more baseline measured values corresponding thereto, or (iii) a combination thereof.

12. The non-transitory, computer-readable medium of claim 9, further comprising determining a sampling rate for the one or more sensors from which the in-use behaviors are determined, wherein determining the sampling rate comprises performing a sweep of different sampling frequencies for each of the one or more sensors.

\* \* \* \* \*